(12) United States Patent
Putterman et al.

(10) Patent No.: US 7,741,615 B2
(45) Date of Patent: Jun. 22, 2010

(54) HIGH ENERGY CRYSTAL GENERATORS AND THEIR APPLICATIONS

(75) Inventors: Seth Putterman, Los Angeles, CA (US); James K. Gimzewski, Los Angeles, CA (US); Brian B. Naranjo, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 384 days.

(21) Appl. No.: 11/596,586

(22) PCT Filed: Apr. 22, 2005

(86) PCT No.: PCT/US2005/014003

§ 371 (c)(1),
(2), (4) Date: Feb. 19, 2008

(87) PCT Pub. No.: WO2006/060030

PCT Pub. Date: Jun. 8, 2006

(65) Prior Publication Data

US 2008/0251735 A1     Oct. 16, 2008

Related U.S. Application Data

(60) Provisional application No. 60/572,881, filed on May 19, 2004.

(51) Int. Cl.
*H01J 27/00* (2006.01)

(52) U.S. Cl. ............... 250/424; 250/423 R; 250/492.3; 250/341.2; 435/6; 435/183; 435/91.1; 313/11; 313/15; 313/37

(58) Field of Classification Search ............... 250/424, 250/423 R, 492.3, 341.2; 435/6, 183, 91.1; 313/11, 15, 37
See application file for complete search history.

(56) References Cited

U.S. PATENT DOCUMENTS

| 3,258,402 | A | | 6/1966 | Farnsworth | |
| 3,386,883 | A | | 6/1968 | Farnsworth | |
| 3,840,748 | A | * | 10/1974 | Braunlich | 378/122 |
| 5,293,410 | A | * | 3/1994 | Chen et al. | 376/108 |
| 5,723,954 | A | | 3/1998 | Sampayan | |
| 6,479,924 | B1 | | 11/2002 | Yoo | |
| 7,361,821 | B2 | * | 4/2008 | Chan et al. | 435/183 |

(Continued)

OTHER PUBLICATIONS

Geuther, J.A., Danon, Y. "Electron and positive ion accelreation with pyroelectric crystals" Journal of Applied Physics vol. 97, 074109 (2005).*

(Continued)

*Primary Examiner*—Jack I Berman
*Assistant Examiner*—Meenakshi S Sahu
(74) *Attorney, Agent, or Firm*—Venable LLP; Henry J. Daley

(57) ABSTRACT

Ferroelectric, pyroelectric and piezoelectric crystals are used to generate spatially localized high energy (up to and exceeding 100 keV) electron and ion beams, which may be used in a wide variety of applications including pulsed neutron generation, therapeutic X-ray/electron devices, elemental analysis, local scanning chemical analysis, high energy scanning microscopy, point source compact transmission electron microscopy, compact ion beam sources, positron sources, micro-thrusters for ion engines, and improved fusion efficiency especially of the Farnsworth type. The high-energy emission can be created by simply heating the material or by application of external coercive electromagnetic and acoustic fields.

23 Claims, 4 Drawing Sheets

U.S. PATENT DOCUMENTS

2002/0012860 A1  1/2002  Yoo
2008/0142717 A1* 6/2008  Naranjo et al. ............ 250/341.2

OTHER PUBLICATIONS

M.E. Lines, A.M. Glass; Principles and Applications of Ferroelectrics and Related Materials, Clarendon Press Oxford 1977.
B.A. Strukov, A.P. Levanyuk; Ferroelectric Phenomena in Crystals, Springer, Berlin 1998.
Y. Xu, Ferroelectric Materials and their Applications, North Holland Amsterdam (1991).
H. Riege, Electron Emission From Ferroelectrics, Nucl. Instr. Meth. Phys. Res. A 340, 80-89 (1994).
Glass, A.M. Dielectric, thermal and pyroelectric properties of Ferroelectric $LiTaO_3$. *Phys. Rev.* 172, 564-571 (1968).
Rosenblum, B., Braunlich, P. & Carrico, J.P. Thermally stimulated field emission from pyroelectric $LiNbO_3$. *Appl. Phys. Lett.* 25, 17-19 (1974).
Brownridge, J. D., Shafroth, S.M., Trott, D.W., Stoner, B.R. & Hooke, W.M. Observation of multiple nearly monenergetic electron production by heated pyroelectic crystals in ambient gas. *Appl. Phys. Lett.* 78, 1158-1159 (2001).
Naranjo, B. & Putterman, S. Search for fusion from energy focusing phenomena in ferroelectric crystals. (http://www.physics.ucla.edu/~naranjo/ucei/ucei.pdf) (Feb. 2002).
Danon, Y. A novel compact pyroelectric x-ray and neutron source (http://neer.inel.gov/abstsract.asp?ProjectID=126) (2003).
Brownridge, J.D. & Shafroth, S.M. Electron and positive ion beams and x-rays produced by heated and cooled pyroelectric crystals such as $LiNbO_3$ and $LiTaO_3$ in dilute gases: phenomenology and applications. http:://www.bingbamton.edu/physics/Brownridge%20Summary.pdf) (2004).
B.P.Barber, R.A. Hiller, R. Lofstedt, S.J. Putterman, K.R. Weninger, Defining the Unknowns of Sonoluminescence; Phys. Rep. 281, 65-144, (1997).
J.D. Brownridge, S. Raboy, Investigations of Pyroelectric Generation of X-Rays, J. Appl. Phys. 86, 640-647 (1999).
G. Rosenman, D. Shur, Ya. E. Krasik, A. Dunavsky, Electron Emission from Ferroelectrics; J. Appl. Phys. 88, 6109-6161 (2000).
T.A. Jung et al, Chemical Information from Scanning Probe Microscopy in R.Wiesendanger, Scanning probe Microscopy: Analytic Methods, Springer (1998).
D. Skoog, F. Holler, T. Nieman, Principles of Instrumental Analysis, Harcourt (1998), ch. 12.
S.J. Pennycock, D.E. Jesson, Phys. Rev. Lett 64, 938 (1990).
D.E. Jesson, S.J. Pennycock, L. Baribeau, Phys. Rev. Lett. 66, 750 (1991).
Reimer, L. (1985): *Scanning Electron Microscopy. Physics of Image Formation and Micronanalysis*, 2nd edn. Springer Ser. Opt. Sci., 45 (springer, Berlin, Heidelberg).
Reed, S.J.B. (1975): *Electron Microprobe Analysis* (Cambridge Univ. Press, London).
Goldstein, J.I., Newbury, D.E., Echlin P., Joy, D.C., Fiori, C., Lifshin, E. (1981): *Scanning Electron Microscopy and X-Ray Microanalysis* (Plenum, New York).
S.J. Pennycock, L.A. Boatner, Nature 336, 565 (1988).
D.E. Newbury, Nanotechnology 1, 103, (1990).
N.D. Browning et al., Nature 366, 143, (1993).
D.A.Muller et al., Nature 366, 725, (1993).
P.E. Batson, Nature 366, 727 (1993).
P.E. Batson, J. Electron Microsc. 45, 51(1996).
S.R. Morrison, *The Chemical Physics of Surfaces*, 2nd edn. Plenum, New York (1990).
C.F. Quate, Surf. Sci. 299/300, 980, (1994).
G. Binnig et al., Phys. Rev. Lett. 50, 120 (1983).
R.J.Hamers et al., Phys. Rev. Lett. 60, 2527 (1986).
T.A. Jung et al., Phys. Rev. Lett. 74, 1641, (1995).
F.J. Himpsel, J. Gimzewski et al. Jpn. J. Appl. Phys. Pt. 1, 35, 3695 (1996).
D.W. Pohl, Scanning Near-field Optical Micrsocopy (SNOM) in *Advances in Optical and Electron Microscopy*, 12, 243 (London 1991).
D.W. Pohl, "*Nano-Optics and Scanning Near-Field Optical Microscopy*," in *Scanning Tunneling Microscopy II: Further Applicartions and Related Scanning Techniques*, ed. by R. Wiesendanger and H.-J. Guntherodt, 2nd edn, Springer Ser. Surf. Sci., vol. 28 (Springer, Berlin, Heidelberg 1992) pp. 223-271.
E. Betzig, J.K. Trautman, Science 257, 189, (1992).
H.Heinzelmann, D.W. Pohl, Appl. Phys. A 59, 89, (1994).
E. Betzig, R.J. Chichester, Science 262, 1422 (1993).
J.K.Trautman et al., Nature 369, 40 (1994).
M.A. Paesler, P.J. Moyer, *Near-Field Optics. Theory, Instrumentation and Applications* (Wiley, New York 1996).
J.K. Gimzewski et al., Z. Phys. B 72, 497 (1988).
P.Johansson et al. Phys. Rev. B 42, 9210 (1990).
R. Berndt, J.K. Gimzewski, P. Johansson, Phys. Rev. Lett. 67, 3796 (1991).
B.N.J. Persson, A. Baratoff, Phys. Rev. Lett. 68, 3224 (1992).
Y Uehara, et al., Jpn. J. Appl. Phys. 31, 2465 (1992).
R. Berndt, J.K. Gimzewski, P. Johansson, Phys. Rev. Lett 71, 3493 (1993).
R. Berndt et al., Phys. Rev. Lett. 74, 102 (1995).
R. Berndt et al., Science 262, 1425 (1993).
R. Berndt, J.K. Gimzewski, Phys. Rev. B 48, 4746 (1993).
R. Berndt, J.K. Gimzewski, Phys. Rev. B 45, 14095 (1992).
L.L. Kazmerski , J. Vac. Sci. Technol. B 9, 1549, (1991).
J.K. Gimzewski et al., Ultramicrosc. 42/44, 366 (1991).
B. Michel et al., Rev. Sci. Instrum. 63, 4080 (1992).
J.P.Bourgoin et al., Appl. Phys. Lett. 65, 2045 (1994).
D. Rugar et al., Nature 360, 563 (1992).
D. Rugar et al. Science 264, 1560 (1994).
O. Züger, D. Rugar, D., Appl. Phys. Lett. 63, 2496 (1993).
O. Züger et al., J. Appl. Phys. 75, 6211 (1994).
W.J. Fan et al., J. Appl. Phys. 79, 188 (1996).
H.J. Kreuzer et al., Lensless Low Energy Point Source Microscopy, in Nanoscience and Manipulation of Atoms under High Fields and Temperatures: Applications, Vu T Binh, N. Garcia, K. Dransfeld; Kluwer Academic Dordrecht (1993).
N. de Jonge et al, High Brightness Electron Beam from a Multi-Walled Carbon Nanotube, Nature, 420, 393 (2002).
K. Hirahara et al. One Dimensional Metallofullerene Crystal Generated Inside Single Walled Carbon Nanotubes, Phys. rev. Lett. 85, 5384 (2000).
D.J. Hornbaker et al, Mapping the One-Dimensional Electronic States of Nanotube Peapod Structures, Science 295, 828 (2002).
Nevins, W.M. Can inertial electrostatic confinement work beyond the ion-ion collisional time scale? *Physics of Plasmas* 2, 3804-3819 (1995).
Hirsch, R.L. Inertial-electrostatic confinement of ionized fusion gases. *J. Appl. Phys.* 38, 4522-4534 (1967).
Mitterauer, J. Micropropulsion for small spacecraft: a new challenge for field effect electric propulsion and microstructure liquid metal ion sources. *Surf. Interface Anal.* 36, 380-386 (2004).
Naranjo, B., J. Gimzewski, J., Putterman, S., Observation of nuclear fusion driven by pyroelectric crystal, Nature (2005).
Written Opinion of the Internation Searching Authority for PCT/US2005/014003. Nov. 29, 2006.

* cited by examiner

HIGH ENERGY CRYSTAL GENERATORS AND THEIR APPLICATIONS

CROSS-REFERENCE TO RELATED APPLICATION

This application claims priority to International Application No. PCT/US2005/014003, filed Apr. 22, 2005 and U.S. Provisional Application No. 60/572,881, filed May 19, 2005 the entire contents of which are incorporated herein by reference.

This invention was made with government support under the Office of Naval Research, Grant No. N00014-03-1-0762. The U.S. Government has certain fights in this invention.

BACKGROUND OF THE INVENTION

1. Field of the Invention

The present invention relates generally to the use of ferroelectric, pyroelectric and piezoelectric crystals for energy transduction via high-energy emissions (HEE). The HEE can be created by simply heating the material or by application of external coercive electromagnetic and acoustic fields. The present invention is directed to the use of such crystals to generate spatially localized high energy (up to and exceeding 100 keV) electron and ion beams, which may be used in a wide variety of applications including, for example, nuclear fusion, electron/ion emission, therapeutic X-ray/electron devices, elemental analysis systems, localization of emission, local scanning chemical analysis, high energy scanning microscopy, point source compact transmission electron microscopy, compact electron-ion beam sources, positron sources, micro-thrusters for ion engines, electrostatic fusors of the Farnsworth type, but with higher conversion efficiency, compact continuous and pulsed neutron generators.

2. Description of Related Art

The publications and other reference materials referred to herein to describe the background of the invention and to provide additional details regarding its practice are hereby incorporated by reference. For convenience, the reference materials are numerically referenced and identified in the appended bibliography.

Ferroelectric crystals have been studied in the past (1). Relatively recently, it was discovered that ferroelectric crystals are able to provide energy transduction by an unusual process referred to as high-energy ferroelectric emission (In the literature this is referred to as FEE, but here we will refer to this effect as HEE because the present inventions are not limited to ferroelectric materials. Instead, the present inventions apply also to pyroelectric and piezoelectric materials.) (2). Ferroelectric crystals, like other pyroelectric crystals, exhibit spontaneous polarization, which is a function of temperature. Heating or cooling a ferroelectric crystal in a vacuum causes bound charge to accumulate on the crystal faces that are normal to the polarization. A modest change in temperature can lead to a large electrostatic field. For example, heating a lithium tantalite crystal from 240 K to 265 K decreases its spontaneous polarization by 0.0037 $C/m^2$. (2a). In the absence of spurious discharges, introducing this magnitude of surface charge density gives a potential of 100 kV in energy emissions.

Attempts to harness the above energy potential have focused on electron acceleration and the accompanying bremsstrahlung radiation (2b-2d and 5). Less focus has been placed on using ferroelectric crystals to produce and accelerate ions that may be used for a variety of purposes including fusion. (2e-2g). Furthermore our recent finding indicates that fields in excess of 120 KV can be achieved.

SUMMARY OF THE INVENTION

The present invention is based on the discovery that ferroelectric, pyroelectric or piezoelectric crystal generator devices can be designed that provide for the emission of high energy particles, such as 100 KeV electrons from a three by one cubic centimeter ferroelectric material that is heated just a few degrees above room temperature. In accordance with the invention, the crystal generators can be put to use for a new class of detectors, microscopes and display panels. In addition the generators can be used as an energy source for conducting fusion and in any situation where a localized source of energy is required.

In accordance with the present invention, a crystal generator is provided for producing a beam of ions or electrons. The crystal generator includes a ferroelectric, pyroelectric or piezoelectric crystal having a beam generating surface. An electrode is attached to the crystal at the beam generating surface. As a feature of the present invention, the electrode includes a beam directing tip that extends away from the electrode and the beam generating surface. A temperature control element is included that provide for changing the temperature of the crystal to thereby produce a beam of ions or electrons that is emitted from said beam directing tip. If desired, the electron beam produced by the generator may be converted into x-rays.

The crystal generator may be used as the source of energy in a wide variety of systems where a localized or compact beam of high energy ions or electrons is needed. Such systems include fusion, electron/ion emission driven by coercive field or acoustic stress or heating, therapeutic X-ray/electron devices, elemental analysis systems, localization of emission, local scanning chemical analysis, high energy scanning microscopy, point source compact transmission electron microscopy, compact ion beam sources, positron sources, micro-thrusters for ion engines, and as a way to get finer and pixilated and increased efficiency of electrostatic fusors of the Farnsworth type. And as front end deuterium ion beam sources for API [associated particle imaging].

The above discussed and many other features and attendant advantages of the present invention will become better understood by reference to the following detailed description when taken in conjunction with the accompanying drawings.

DETAILED DESCRIPTION OF THE INVENTION

Figure 1:
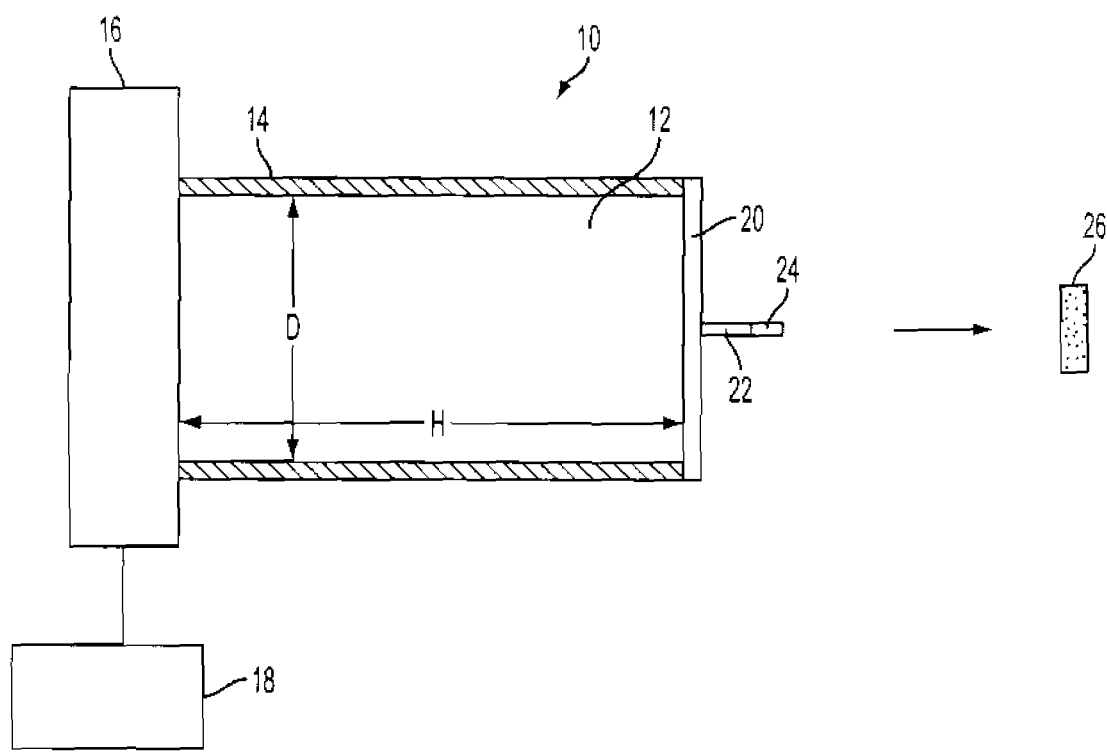
FIG. 1 is a diagrammatic representation of an exemplary ferroelectric electron/ion generator in accordance with the present invention.

An exemplary ferroelectric electron and ion generator is shown in FIG. 1 at 10. The generator 10 includes a rod shaped ferroelectric crystal 12 that has a diameter (D) of between 1 micron and 5 centimeters. Thicknesses on the order of 1 mm or less are preferred for small applications where rapid thermal cycling is desired. One mm is the typical size of an object that can be safely inserted into a body for a medical procedure. Also 1 mm is large enough to generate fields of 10.KeV and more. Diameters on the order of 20 to 100 microns are also well suited for many applications use in arrays. Total sizes are much larger for devices and systems where more energy is required. For example, crystal diameters on the order of 3 cm may be used in fusion applications.

The crystal 12 has a height (H) that is between 1 micron and 5 centimeters. Heights on the order of 1 mm or less are also preferred for small applications with heights of around 100 microns being particularly preferred for use in arrays. Heights on the order of 1.0 cm are used when more energy is required, such as in generating energy beams for fusion.

The size and shape of the crystal 12 will depend upon the intended use. In the case of thermal stimulation, smaller crystals will have a higher bandwidth while larger crystals will generate more energy. Electric field stimulation provides a high bandwidth under other circumstances. The crystal 12 may be made from ferroelectric, pyroelectric or piezoelectric materials depending on the application. These materials include $LiNbO_3$ and $LiTaO_3$ and tri-glycine sulfate.

In the case where faster thermal cycling is required—such as when one wants to achieve a higher flux of neutrons ions electrons—the crystals can be laminated. That is, smaller crystals can be stacked so as to form a bigger crystal. In this case one gets the benefits of the larger field of a bigger crystal along with the benefit of a faster cycling time, in the event that each lamina is attached to its own heater.

If desired, the crystal 12 may be surrounded with a jacket 14 to prevent sparking. The jacket 14 is made from a non-metallic material to prevent shorting out of the device. The thickness of the jacket 14 will vary typically depending upon the size of the crystal and the intended use. The crystal rod 12 typically has a cylindrical cross-section. However, other cross-sectional shapes are possible, and one can also use self-assembled materials on the crystal surface to also gain control over the electric fields.

As shown in FIG. 1, the ferroelectric crystal rod 12 is located on a thermal cycling block or surface 16. The thermal block 16 provides for heating and cooling of the crystal rod 12 between the temperatures that are selected to provide generation of electrons or ions. The thermal cycling block 16 is under the control of a control module shown diagrammatically at 18. Together they constitute a temperature control element. In one thermal cycle, the crystal rod 12 is heated to a given temperature that is sufficient to generate electrons or ions and then cooled to the starting temperature. For small crystals (dimensions on the order of a few hundred microns or less) control module may be set to provide thermal cycling at frequencies up to a few hundred cycles per second or more.

As a feature of the present invention an electrode or cap 20, which optionally includes a beam-directing tip 22, is attached to the end of the crystal 12 to provide a point source beam. The electrode 20 may be made from a wide variety of metallic materials including copper, gold, titanium, tungsten and mixtures thereof. The cap 20 may be any shape provided that it prevents electrons/ions from being uncontrollably emitted from the tip of the crystal rod 12 and should not overlap onto the sides of the crystal. The electrode or cap 20 may be etched or include a tip 22 to produce a beam of electrons/ions that is emitted from the crystal.

The use of a beam-directing tip 22 to control the electron/ion beam is preferred. The beam-directing tip 22 can be made of any suitable solid or tubular material that provides additional control and direction to the electrons or ions that are emitted during thermal cycling of the ferroelectric crystal 12. The tip 22 will be from a few nanometers to 1 cm long and have diameters form 1 nanometer to tens of microns. The tip 22 may be hollow or be filled with a suitable material that provides conversion of electrons emitted through the tip 22 into x-rays. Suitable materials include metals, such as platinum and tungsten. Carbon nanotubes may also be used. The carbon nanotubes may be hollow or filled with a metal or other desired material. In one embodiment, as shown in FIG. 1, the beam directing tip includes a solid metal portion 22 to which is attached a carbon nanotube 24. The carbon nanotube may be filled with a metal, if desired, to convert the electron beam emitted from the metal tip 22 into an x-ray beam.

The ion/electron generators described above may be used alone or in arrays in many different types of systems and processes where a source of electrons an/or ions is required to be directed to a target 26. As will be set forth in the examples below, a wide variety of targets 26 are possible. The particular configuration and size of the generator will vary depending upon the system in which it is being used. The generators may be used as a compact ion accelerator for a variety of processes. The generators may be combined in arrays (with or without jacketing and/or capping) to provide flat panel displays that are thermally driven. The generators when jacketed and fitted with an appropriate tip can be used to provide focused high energy electrons and ions for use in compact transmission electron microscope or high energy scanning probe microscope to provide elemental analysis. The generators may also be used as the x-ray source for small (i.e. hand held) x-ray detection systems for elemental analysis.

It should be noted that the direction of polarization need not be parallel to the tip orientation. If the tip is mounted at the edge of the crystal then the polarization can be orthogonal as well to polarization. This would allow for crystals to be mounted in a more favorable orientation for endoscope applications.

Suppression of the ion current is possible by the addition of a second field-emitting tip in the proximity of the top electrode where the field emission tip is situated. Here the high positive charge on the electrode would be suppressed by field emission from the grounded tip in close proximity. This is the equivalent of a high voltage diode and would not influence the regular field emission.

The generation of X-rays for radiotherapy purposes can be finely tuned, not only to dose, but also energy. For the dose, a cantilever coated with a polymer layer which cross-links and which has a piezoresistive position readout via a wheatstone bridge (known in the prior art) would act as a radiation monitor for the dose. This would enable the dosage to be accurately monitored in situ and occupy a space of some 500 microns by 50 microns. The energy of the x-rays would be optimized by the target material Al, Mg, Cu, and the like, as well as the dimensions of the crystal that determine the charge and the maximum energy.

The use of the device as a radiotherapy tool is possible in many different embodiments ranging from large devices for melanoma, to small devices for endoscopes and imaging devices with ccd cameras. The devices could also be integrated into surgical tools so that the tools such as scalpels and forceps become self-cleaning, that is, they kill cancer cells in the vicinity of the cut. This can be achieved by using lower energy X-rays with shorter penetration depths requiring lower voltages. The x-ray source may also be put onto a capsule for swallowing with a small camera and operate from batteries or from magnetic dynamos externally driven through coupling. They would then be activated as they pass naturally through body cavities.

The X-ray devices may be inserted into needles and enter the body. The x-ray devices can be deployed from space craft and aircraft as swarms which coupled to tiny x-ray detectors and radio communication systems would analyze the atmosphere and ground for specific elements, such as plutonium, and the like.

The following general definitions apply to the present specification:

1) By crystal, we mean ferroelectric, pyroelectric and piezoelectric materials where the electric fields developed in response to various applied stimuli are optimized. Stimuli include imposed temperature changes, ambient pressure, electric fields, stresses and strains. Optimization of the response of a crystal includes control of its size, purity, conductivity, dielectric coefficient, chemical composition and mounting. Examples of chemical compositions that are used to make crystals include Lithium Niobate, Lithium Tantalate, Tri-Glycine Sulfate.

2) By mounting, we mean the method used to attach the crystal to a heater/cooler or other source of stimulus. We also mean the technique used to fasten a tip or electrode to a crystal face. Examples of glues are conducting and non-conducting epoxy, vacuum glues, silver paint. Other mounting methods include clamping.

3) Electrodes are surfaces that condition the electric field generated by the crystal. Examples are gold/Aluminum/tungsten sheets/foils/films.

4) Some applications utilize deuterated systems. This means that deuterium gas [or tritium gas] has been introduced into the region of the crystal and/or that the hydrogen in the crystal has been replaced with deuterium/tritium. And that deuterium has been adsorbed onto the crystal surface or loaded into the crystal. Or that in addition a target made with Deuteriu or tritium is used.

5) By a tip, we mean a region which has a sharp/rounded edge whose radius of curvature ranges from microns down to 10 nanometers. A tip can also include a metal tip, as mentioned above, which has mounted onto it a carbon nanotube.

6) By environment, we mean the ambient temperature humidity pressure in which any system is operated.

7) By a matrix of crystals, we mean a grouping into an array that optimizes the field or current. This could be a mosaic of crystals in the shape of a sphere. Again the geometry has been chosen to maximize the electric field and other design parameter.

The above quantities are chosen so as to minimize/prevent unwanted internal and surface discharges [i.e. sparking]. The design and dimension parameters for the device may be varied. They are determined by, among other things, the desired strength of the electric field, its localization, the current of ion and electrons emitted, the energy and quantity of x-rays generated by the crystal with various mountings, tip and stimuli, as set forth above.

An exemplary device, as depicted in FIG. 1, includes a lithium tantalate crystal, which is attached to a copper heater/cooler with epoxy. On a face of the crystal, is an aluminum electrode and mounted into the electrode is a platinum wire whose end forms a tip with radius of curvature 100 nanometers. This is an example of a particular choice of parameters as outlined above.

When the lithium tantalite crystal is heated/cooled, electrons are emitted in one phase and ions are emitted in the other phase. By controlling tip radius, temperature, and other parameters, as listed above, unwanted sparking is minimized and a localized emission can be achieved which may be measured as an image made by the electrons on a phosphor screen centimeters from the crystal and tip. The divergence, as indicated by the image, is less than 3 degrees. When the electrons are stopped, they yield x-rays, whose spectrum is a measure of the energy of the electron and ion emission. The spectrum extends up to and beyond 100 KeV. By varying parameters discussed above it is possible to reach energies in excess of 500 KeV. Lower values e.g. 10 KeV can also be achieved. By varying tip size and other parameters, it is also possible to tune the electron/ion energy to a precise value.

The following is a summary of the types of systems in which the electron/ion beam generators of the present invention are directed against a variety of different targets.

1) Fusion: The ion energies achieved with stimulated crystals in accordance with the present invention are easily into the range where collisions with deuterated [tritiated] targets create fusion with the release of neutrons and energy and other high energy particles. Use of crystals as described above to generate ion beams for this purpose is within the scope of the invention. The invention also includes the use of a deuterated crystal as a source and target to increase the efficiency of energy conversion. Further, it is also contemplated to use a mosaic of crystals in the shape of a sphere or other surface to provide additional focusing that enhances fusion. Each element of the mosaic can be individually controlled to create fields tailored to improve focusing.

2) Electron/ion emission driven by coercive field: For some crystal generators in accordance with the invention, application of a coercive electric field [a voltage] forces the entire domain structure to flip. This creates a huge unbalanced electric field that can release a pulse of electrons/x-rays/ions. Use of a coercive field to make such pulses is contemplated within the present invention. Repetitive: application of the coercive field to increase signal is also part of the invention. Also covered is the means whereby coercive fields can be used to create pulsed high energy emissions.

3) Therapeutic x-ray/electron devices: By cycling a small crystal generator in accordance with the present invention, one can achieve therapeutic yields of 1-10 Grays/second/cc.

Here is an example of the scaling laws that allow one to estimate yield

X-rays emitted~surface charge~$\Delta P \pi D^2/4$ $\Delta P$ is due to heating or flipping or acoustic stress and other criteria as discussed above, Typical values are 1.-5. μCoulombs/cm$^2$, but it can be as large as 70 μC/cm for currently known materials P is the spontaneous polarization D is the crystal diameter [~length]

Accelerating Potential is $\Phi \sim \Delta PD/2\kappa \in_0$ $\hat{E}$~10-50 is the dielectric constant $1/\in_0 = 4\pi \times 10^{10}$ VoltMeter/Coulomb As an example, take D=1 mm

X-rays emitted~$10^{11}$ $\Phi$ ~20,000. Volts

Total Energy/Cycle of FE~0.0001 Joule

Or 1/10th Gray for a 1 cc target

Thermal Cycling ~10 Hz

Coercive Cycling [+/−100V for Triglycine sulphate]~>100 Hz

[1Gray=100 rad is a therapeutic dose].

As the above calculations show, cycling a crystal generator in accordance with the present invention can lead to electron yields that can be used to make x-ray yields in the range of Grays/second. This is a therapeutic dose. This provides a means whereby stimulated small crystals employing the features of the present invention are used to make compact devices that can deliver x-rays [or high energy electrons] to small or otherwise inaccessible regions for therapeutic applications. The localized energy beam produced by the crystal generator of the present invention minimizes damage to surrounding tissue.

4) Elemental analysis: when x-rays/electrons hit a target, the resulting spectrum of emitted light has lines [responses at particular wavelengths] which can be used to determine the elemental makeup of the material. The crystal generators of the present invention can be used as the x-ray/electron source in the known apparatus which are used to conduct elemental analysis. Neutrons from the fusion arrangement can also be used for elemental analysis based upon the gamma rays emitted from the excited states of nuclei.

5) Localization of emission: the use of tips in accordance with the present invention causes the stimulated crystal to emit from a localized region. This localized emission can be used in a wide variety of situations where it is desirable to provide patterned emissions via the use of many tips.

6) Scanning surface probes using localization of emission: the crystal generators of the present invention can be used to provide localized emission in a scanning mode to measure target properties as a function of position and time. As many crystals are also piezoelectric, then an application of a voltage to a crystal can also cause it to walk and scan the surface. That is, a single crystal is the source of emission and the means of scanning.

7) Local scanning chemical analysis: the emission produced by the crystal generators in accordance with the present invention are localized so that elemental analysis can be carried out in a scanning mode. The resolution achievable should be in the micron or submicron range 8) High energy scanning microscopy: the crystal generators of the present invention may be used as the energy source in microscopy systems where scanning a surface with high energy emission yields detailed properties of the surface.

9) Point source compact Transmission Electron Microscope [TEM]: the crystal generators in accordance with the present invention can be used in TEM systems where the tip attached to the crystal is used to generate the point source electron beam that is used in such systems. The crystal generators of the present invention may also be used to provide the point source electrons to make a point source x-ray microscope.

10) Controlled sputtering and implantation: ion beams from compact crystal emission sources in accordance with the present invention can be use to provide energy beams for controlled sputtering and implantation systems.

11) Positron source: when surface potentials of the crystal generator exceed about 1 Million Volts, the accelerated particles can create positrons. In accordance with the present invention, the crystal generators can be used as a positron source, if desired.

12) Pulsed neutron generator. If the environment in which the crystal sits is reduced in pressure to the point where there are no ions/electrons available for acceleration, then this device can be configured as a PULSED neutron generator. One simply places a known electrically stimulated ion source ion the vicinity of the crystal. When this ion source is pulsed it creates free ions which are then accelerated by the crystal into a target where a neutron burst is created by the fusion.

13) X-ray source modulated at high frequency. When acoustic excitation is used to create $\Delta P$, the sound field can be modulated at 10's of KiloHertz, thus creating a modulated accelerating field for electrons or ions.

14) Associated particle imaging (API). Neutrons from the D-T reaction have an energy in excess of 14 MeV and can penetrate large distances. The fusion reaction also generates an alpha particle. From the detection of the alpha particle and the stimulated gamma emission one obtains the location of the probed material. Devices for carrying out the preceding API process are known. These API devices require a source of high-energy ions, which can be provided by the crystal generators of the present invention t.

Figure 2:
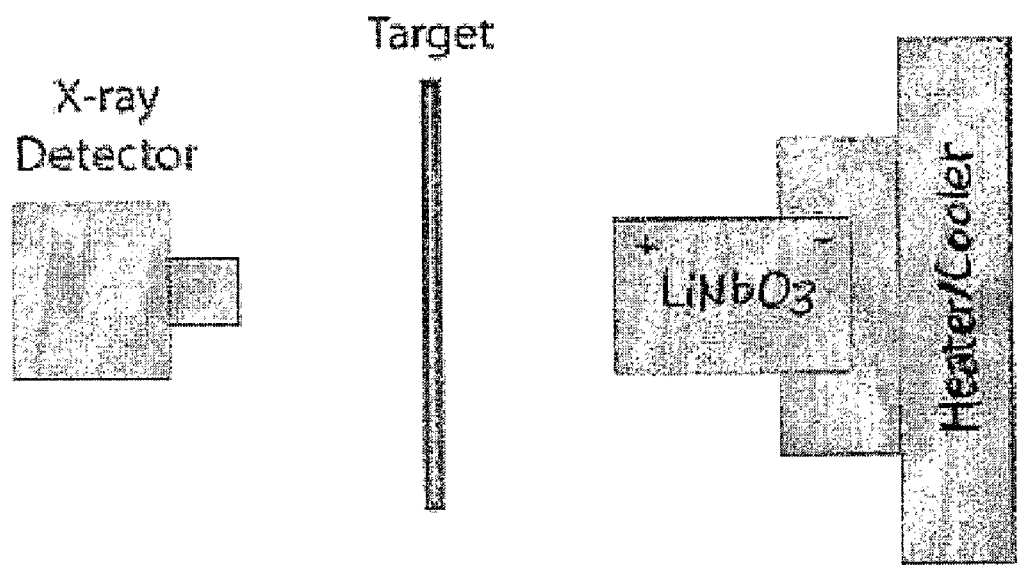
FIG. 2 is a diagrammatic representation of an exemplary experimental set up for demonstrating FEE.

FIG. 2 shows a block diagram of an experiment that was carried out to demonstrate the high energy FEE of a pyroelectric crystal generator in a scientifically reproducible manner. A 1 cm diameter, 1 cm long crystal of lithium niobate was mounted on a [peltier] heater/cooler. When it was heated from room temperature to about 100 C and then cooled, it was easy to observe bright flashes along with a glow from the zinc sulphide target. The glow was recorded with a CCD [Hamamatsu, not shown]. In addition an x-ray detector [Amptek] was used to quantify the emission.

The above-observed effects are due to electrons with energies greater than approximately 100 KeV generating Bremsstrahlung x-rays and visible light upon hitting the target. During heating electrons are thrown off the positive face of the spontaneous polarization of the ferroelectric. We carried out a hundred thermal cycles without observing any degradation of this effect.

Figure 3:
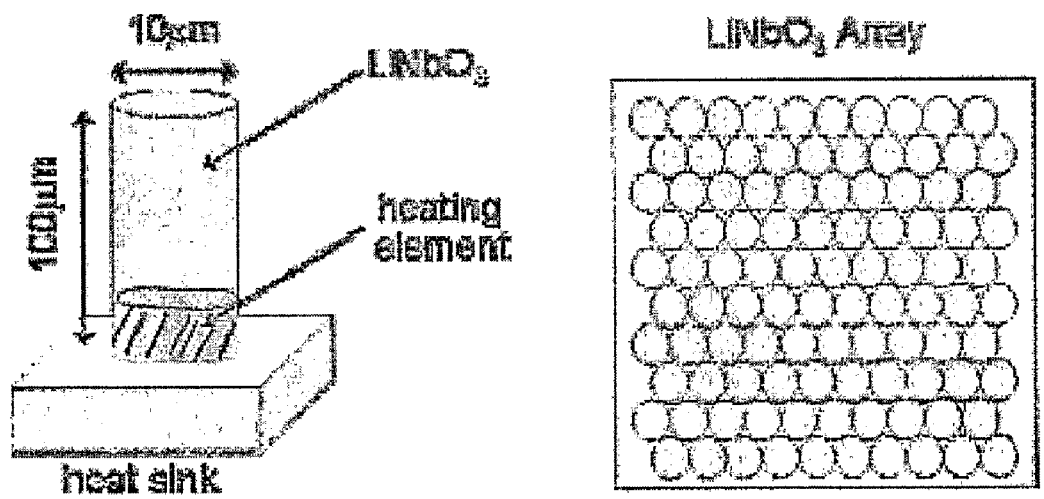
FIG. 3 is a diagrammatic representation of an exemplary micro-rod array in accordance with the present invention.
Figure 4:
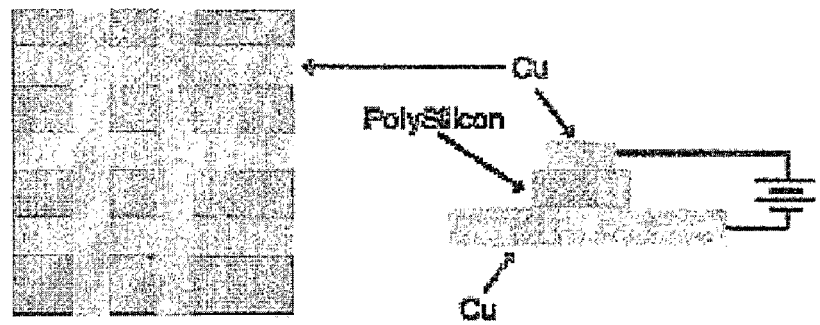
FIG. 4 is a diagrammatic representation of a circuit that can e used to heat crystal generator rods in an addressable fashion.

The present invention also includes scaling up the FEE to provide Flat Panel Displays as shown in FIG. 3. The typical average electron current emitted by a ferroelectric crystal [½ cm in diameter by 1 cm long], which is heated by 40 C, is $10^{-8}$ amps/cm$^2$. While this current is substantial, applications of FEE will be enhanced by its increase. The bottleneck for thermally driven FEE is the rate at which the crystal can be heated, which in turn is limited by diffusion. For example, for lithium niobate, the thermal diffusivity is 0.014 cm$^2$/s. If the sample where decreased in size to say 10 microns×100 microns the cycling time would be shortened by about four orders of magnitude as diffusion times are proportional to distance squared. The rate at which such a micro-rod could be cycled is greater than 100 Hz, and should lead to an FEE current of $10^{-4}$ amps/cm$^2$. Packing these rods into an array as shown in FIG. 3 leads to an emission intensity of 1 Watt/cm$^2$. Each of these rods can be individually addressed via use of a cross-bar array as depicted in FIG. 4. Copper bars, whose potential is floating, are separated by a layer of polysilicon. Voltages applied to a vertical and horizontal bar lead to heating, which can be hundreds of degrees, at their intersection. In an array that is 15"×20" the net emission energy available for luminous display is predicted to approach 2 KW, and to be addressable at a rate exceeding 100 Hz. This type of flat panel array provides a micro-array of lithium niobate crystals that upscales the FEE by 10,000.

The procedures for growing lithium niobate microrods for use in such flat panel displays are known. Lithium niobate can be grown by laser ablation and laser heating can be used to grow LiNbO$_3$ fiber optics (1). When the current for FEE is scaled up, there may be an issue related to 're-priming the pedestal'. To discuss this issue let us return to a model of model of FEE discussed earlier, one where domain flips suddenly create an unbalanced field that kicks particles off the surface. We believe that these particles are external to the lithium niobate. They constitute a charge-compensating layer that naturally forms so as to neutralize an exposed static charge. If the crystal is cycling at a fast rate it may be essential to take some action [which was not needed under the conditions of acquisition for the experiment conducted with the FIG. 2 set-up) to re-prime the pedestal. This may include use of an ion gun or the introduction of an external gas [e.g. neon] into the vacuum chamber.

In another embodiment, the end of the ferroelectric crystal was carefully coated with a gold-titanium mixture and then capped with an etched tip to get all the current out through a single point. Thermal cycling of device displayed a tiny dot of bluish light on a phosphor screen that had the crystal, with a tip, pointing at it. This experiment was carried out at $10^{-8}$ Torr. The spot was visible in spite of the background lighting. The current was very stable and the spot was well focused despite that 1 cm distance from tip to screen.

Figure 5:
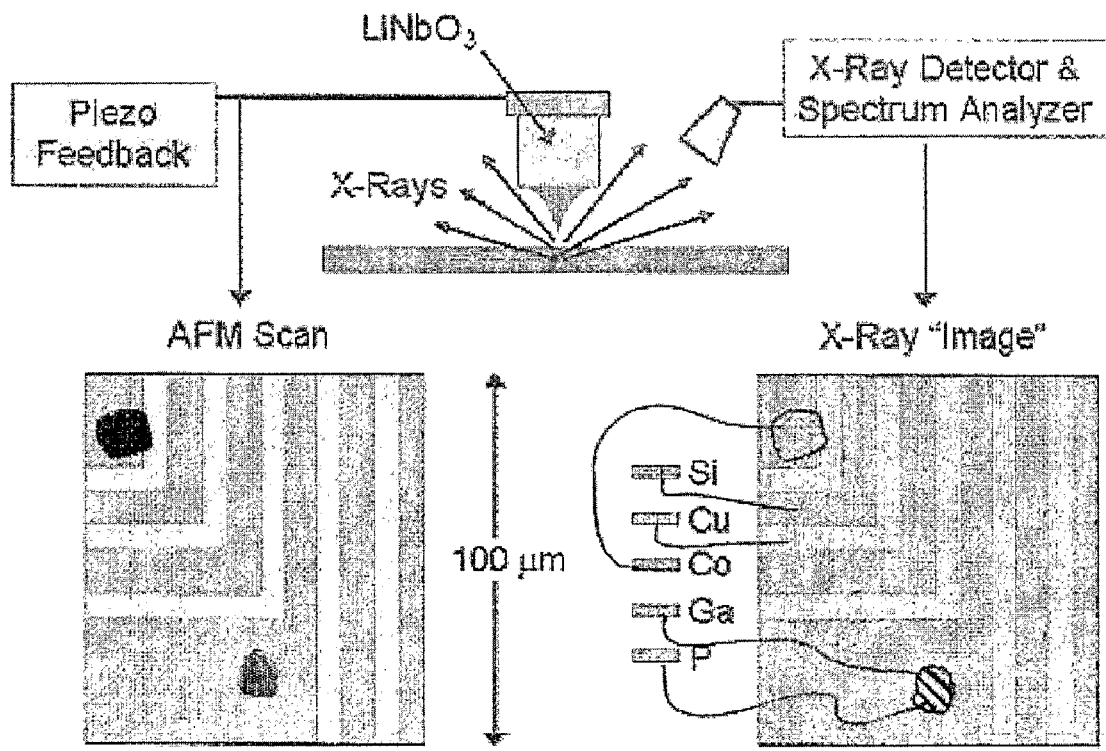
FIG. 5 is a diagrammatic representation of a ferroelectric scanning probe microscope using a crystal generator in accordance with the present invention, as it is applied to a microelectronic circuit.

The ferroelectric generators may be used as the energy source for scanning x-ray analysis as shown diagrammatically in FIG. 5. Elemental and chemical information is essential to our understanding of all processes and mechanism in science, engineering, and technology. The increasing importance of laterally confined nanometer-sized structures and object on surfaces and at interfaces demands both high spatial resolution and non-destructive analytical techniques. The ability to generate relativistic electron emission in a compact device in accordance with the present invention and to focus this emission to a point, simply by heating, provides a route for local chemical/elemental analysis in parallel with scanning probe microscopy. Conventional probes provide no method for local chemical analysis (6) outside the valence band. FIG. 5 shows a schematic of a version of a microscope that utilized a crystal generator in accordance with the present invention and that will locate and identify the elemental makeup of impurities in a microelectronic circuit.

The tip of the crystal generator of the present invention can be used both as an AFM probe of the surface and as a 'point' source of high energy electrons that excite x-ray transition in the sample. In this way the x-ray spectral analysis (7) will be locally labeled by the AFM signal. This is achieved by combining two modes of operation. In mode 1, topography is measured via the tuning fork method (8). In mode 2, the areas of interest in the topographical image can be analyzed by x-ray fluorescence [XRF] by withdrawing the tip and heating the crystal so as to generate FEE.

It has been demonstrated that a field emission tip attached to a scanning tunneling microscope [STM] can be used to create local auger spectra as well as energy ion spectra. However, the electronic field around the tip complicates analysis and has to date prevented general application of the method. The availability of high-energy electrons (100 kev) provided by the ferroelectric crystal generators of the present invention provides several outstanding advantages over other possible methods for energy dispersed x-ray analysis using scanning probe microscope techniques. First, high-energy electrons are generated just at the apex region of the tip. It is extremely difficult to actually bias an STM based system to 100 kev because of the required insulation and increased mass of wires as well as electrical isolation. The electrical capacitance involved in bringing a high voltage tip also makes control of the process difficult. Second, since ferro electronics are also piezoelectric, they can be used advantageously in the tuning fork approach to atomic force microscopy; thereby enabling high-resolution topographic data as well as controlling tip proximity. We foresee the need to withdraw the tip for energy dispersed x-ray analysis and this can be controlled with great accuracy using the tuning fork approach.

The crystal generators of the present invention may also be used in systems for obtaining chemical and elemental information from Scanning Probe Microscopy and Spectroscopy. Elemental and molecular composition, reactivity, bonding adsorption and desorption, and site specificity have recently been reviewed (6). Cooperative approaches to surface analytical problems, as provided by the present invention, are essential.

Chemical analysis of matter consists of the determination of either elemental or molecular composition. Traditionally, a small amount of material is separated into different phases by physical methods, and the elemental composition of each phase is determined by quantitative chemical reactions. The amount of material required for chemical analysis has decreased continuously as increasingly sensitive analytical tools have become available. Prominent techniques are Nuclear Magnetic Resonance (NMR), Electron Spin Resonance (ESR), Rutherford Back-Scattering (RBS) of ions, X-ray and optical/UV fluorescence, Atomic Absorption Spectroscopy (AAS), Mass Spectroscopy (MS), various versions of chromatography, and optical spectroscopy. Ultimate sensitivity is obtained for single-event counting in gas chromatography/MS. However, the detailed analysis of complex mixtures typically involves larger amounts of material and a combination of methods and experimental approaches. At surfaces and interfaces, the relevant chemical composition varies strongly with monolayer depth and lateral dimensions at grain boundaries.

In technological microstructures, commercial microelectronics operate on 300-nm design scales. Hence, use of non-destructive techniques and a high locally confined detection sensitivity are fundamental prerequisites. Typical techniques for the analysis of surfaces and interfaces are Secondary Ion Mass Spectroscopy (SIMS), Auger Electron Spectroscopy (XPS), and X-ray Absorption Spectroscopy (XAS). Viewed edge-on interfaces can also be analyzed by Scanning Transmission Electron Microscopy (STEM) (9) where Electron Energy Loss Spectroscopy (EELS) or fluorescence spectroscopy10) of core-level excitations provides element analysis (11). Cathodolumiunescence (CL) stimulated by the nanometer-sized electron beam of a Scanning Electron Microscope (SEM) is widely used to characterize optical and electronic properties of semiconductors. Generally, a trade-off between sensitivity and spatial resolution is ultimately dictated by the number of atoms available for analysis in a dilute sample. Typical lateral resolution limits of conventional methods are of the order of 0.1-1 µm (12). STEM/EELS, however, is able to probe a region of 0.2-0.3 nm across and 1-3 cm deep (13). The above-described techniques of surface characterization and analysis are described in detail in Reference 14. The ferroelectric crystal generators of the present invention may be used as an energy system in the these non-destructive techniques.

The invention of Scanning Tunneling Microscopy (STM) and related Scanning Probe Microscopies (SPM) with their imaging capabilities down to the atomic range (15) has raised hopes that it might one day be possible to determine atomic or molecular compositions with a comparable resolution. Voltage dependent tunneling and Scanning Tunneling Spectroscopy (STS) provide such information via electronic states. Then a variety of other methods to extract chemical information from SPM will be addressed. Topographic contrast at high resolution, light emission and adsorption confined under a local probe as well as the direct measurement of lateral and perpendicular forces and deformations in SPM provide contrast that depends on chemical factors. Nevertheless, all of these methods with a few exceptions rely on electronic, chemical or vibrational information from the low-lying states typically confined to the valence band. Given that chemical bonding strongly influences the width and position of valence electron states, no direct elemental information has yet been routinely obtained as in the case of combining electron microscopy with EELS or EDX. The system set forth FIG. 5 is expected to provide the requisite data to locally determine elemental/chemical makeup.

SPM methods capable of lateral chemical contrast, but not true elemental analysis, include (I-V) tunneling spectra, which relates to local occupied and unoccupied DOS structure within less than 10 ev of the Fermi level (16). Surface and Image states also provide chemical contrast in samples of known composition (16). Various optical and spectroscopic techniques have also been used to attempt to gain information about the local chemical makeup of surfaces. For instance, the characterization of electromagnetic properties in a SPM junction gives access to information that relates to chemical information and complements high-resolution topographs, but the method does not offer true elemental analysis. The emission or absorption of electro-magnetic radiation is a chemically specific characteristic of many excitations of solids and molecules. Plasmons and interband transitions in metals, intrinsic luminescence and luminescent defects in semiconductors, molecular fluorescence, and modified optical properties owing to quantum size effects in metal and semiconductor particles and nanostructures all have been studied. The resolution capabilities and limits of SNOM have been reviewed (17). Optical resolution is of the order of 30 nm. Dilute single molecules with characteristic chromophores have been imaged (18) analyzed using fluorescence characteristics (19) give a general introduction to SNOM-based techniques. In combination with polarized light, SNOM has been used to alter and determine surface magnetization with the magnetooptic Faraday effects. As the typical resolution of most SNOM-based experiments remains in the submicrometer range, chemical imaging requires labeling with one or the other adequate chromophores. The ferroelectric crystal generators of the present invention may be used as the energy source in the above methods.

An alternative approach to optical spectroscopy and mapping is to use the current of the STM tip to generate photon emission locally. Experimental evidence of STM-induced light emission from metals and semiconductors was published in 1988 (20) and subsequently developed (21) Surface emissivity patterns have been proved to map atomic (22) and molecular patterns (23). Selectivity has been demonstrated for nanometer-sized clusters of W on Cu (111), where W was found to quench the photon emissivity of Cu substrate strongly (24). Here the photon emissivity of $TiO_2$ clusters on a Ti substrate was observed to be significantly lowered. Similarly, selective chemoluminescence has been applied to map CdS and GaAs (25).

The inverse process, i.e. the observation of changes in tunneling parameters upon irradiation of the junction with light, has also been used to gather information (26) detected atomic composition on semiconductor surfaces, whereas Gimzewski, et al (27) provide experimental evidence that photon electron emission characteristics can be probed locally using STM. In the context of SPM-based sensing of local electromagnetic properties, it should be noted that scanning surface harmonic microscopy (28) has provided contrast in images of technological dopant patterns (29). Here the resolution currently remains limited to the order of 100 nm.

In another technique derived from magnetic force microscopy, it has been demonstrated that ultimately high sensitivities for ESR and NMR (30) can be achieved. Two-dimensional force maps enabled the reconstruction of spin density images with micrometer-scale spatial resolution (31). Three-Dimensional imaging has also been demonstrated using this technique (32). The expected higher sensitivity of microfabricated force sensors should allow access of single photon detection; these are very impressive achievements. The ferroelectric crystal generators of the present invention may be used as the energy source in the above techniques.

Figure 6:
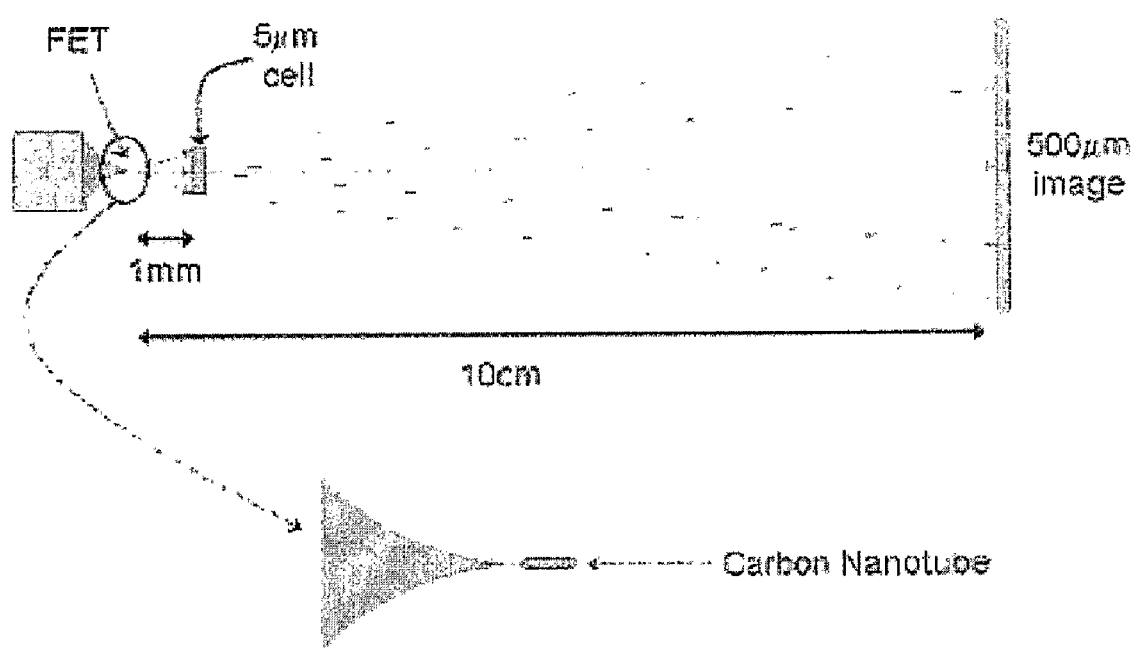
FIG. 6 is a diagrammatic representation of the use of a ferroelectric crystal generator in accordance with the present invention for a point source projection microscope. The tip localizes high-energy electron emission so as to provide resolution. In addition a metal filled carbon nanotube [or other target] can be used to convert the electron source to an x-ray source.

A point source of high-energy electrons provides the ideal realization of a transmission electron microscope (33). Such a system can be made utilizing a ferroelectric crystal in accordance with the present invention that is plated with a metal film and capped off with an etched tip. A schematic of this arrangement is shown in FIG. 6. The resolution of the image that can be obtained depends on the size of the point from which the electrons originate. A 10 nm emission region implies a 10 nm resolution on the image plane. Various extensions of this method are possible. For instance, a carbon nanotube can be attached to the metal tip. It is known that in this case one can achieve electron beams with EMF's of the order of just a few hundred volts (34). As mention above, it is also possible to load the carbon nanotube with metallic inclusions, similar to peas in a pod (35). In this case, the point source electron beam will become a point source of x-rays. This allows one to use the crystal generators of the present invention as a compact point source x-ray projection microscope.

The generators of the present invention may be used as the energy source in handheld x-ray detectors that are used for elemental analysis. If the requirements for a point source are relaxed, then it is possible to efficiently generate x-rays by simply letting the FEE impinge on a gold foil. In this case, one can make a battery operated, compact device that is not radioactive, but which can be used for elemental analysis. The ferroelectric crystal generator of the present invention supplies the electrons and x-rays on command and a small silicon x-ray detector coupled to software analyzes the spectral lines for the various elements. Portability of instrumentation discussed in this embodiment is a key feature. While existing techniques can provide elemental analysis they come at the cost of specialized instruments that are not portable, weighing several tons, requiring specialist operators and costing up to several million dollars. In this embodiment of the invention, all of this instrumentation, power supplies, electronics and electron optics are replaced by a low voltage operational system that can be powered by a USB interface socket from a personal computer. The projected minimum size is smaller than a human hand. The scalability of the FEE effect is such that performance improves upon miniaturization. Also, downsizing of components will reduce the cost. The combination of low cost, performance and the elimination of high voltage electronics are features that have direct applications to Aerospace and Extraterrestrial Exploration. In particular, a low payload XRF analysis system utilizing a crystal generator in accordance with the present invention can easily be incorporated into pilot less spy planes or for chemical analysis on missions to Mars with or without spatial resolution.

In accordance with the present invention, it is possible to generate the emission of 100 KeV ions upon heating a crystal on its positive 'z' base. This happens because the compensating charge on the opposite or negative 'z' side is made up of positively charged ions. When heated the domain flips, which brings a plus charge to the surface and causes the ions to be blown off, with the same energy as is supplied to the electrons. A compact source of fast ions (50 KeV) provides a new route to fusion. With a deuterated atmosphere and a deuterated surface, fusion at energies of 50 KeV is possible. Such fusion was demonstrated using an exemplary crystal generator in accordance with the present invention to generate the high field (greater than 25 V/nm) that is required for gas phase field ionization of deuterium. Details of the this example are set forth below.

A cylindrical (diameter=3.0 cm, height=1.0 cm) z-cut $LiTaO_3$ crystal with the negative axis facing outward onto a hollow copper-heating block. On the exposed crystal face, a copper disc (diameter=2.5 cm, height=0.5 mm) was attached. The copper disc allowed the charge to flow to a tungsten tip attached to the copper disc (shank diameter=80 μm, tip radius=100 nm, length=2.3 mm). The tip geometry was chosen so that the tip field was approximately 25 V/nm when the crystal face was charged to 80 kV.

The generator was placed in a fusion chamber in which the pressure of deuterium was held at 0.7 Pa. The crystal was first cooled down to 240 K from room temperature by pouring liquid nitrogen into the cryogenic feed-through. At t=15 seconds, the copper-heating block was turned on. At t=100 seconds, x-ray hits due to free electrons striking the crystal were recorded. At t=150 seconds, the crystal had reached 80 kV and the field ionization was rapidly turning on. At t=160 seconds (and still not above 0° C.), the neutron signal rose above background. Ions striking the mesh and surrounding aperture created secondary electrons that accelerated back into the crystal, increasing the x-ray signal. At t=170 seconds, the exponential growth of the ion current had ceased and the tip was operating in the strong field regime, where neutral molecules approaching the tip ionize with unity probability. The neutron flux continued to increase along with crystal potential until t=170 seconds, when we shut off the heater. Then, the crystal lost charge through field ionization being faster than the reduced pyroelectric current could replace it, resulting in a steadily decreasing crystal potential. At t=393 seconds, the crystal spontaneously discharged by sparking, which halted the effect. Pulse shape analysis and proton recoil spectroscopy of neutron detector data confirmed that the crystal generator was producing an ion beam of sufficient energy and current to drive nuclear fusion. Accordingly, the crystal generators can be used in electrostatic fusion devices (36) such as Farnsworth fusors (37-39) and as microthrusters in miniature spacecraft (40).

As is apparent from the above description, the ferroelectric crystal generators of the present invention provide a fundamentally new method to generate spatially localized high energy (up to 100 keV) electron and ion beams. The source of the high energy particles stems from an amazing yet unexploited method of energy transduction exhibited by ferroelectrics. Upon non-isotropic thermal cycling, these crystals generate a high electric field that leads to the emission of relativistic electrons with current densities in excess of $10^{-8}$ amperes/cm$^2$. Using field emission tips, extendible to massive arrays of millions of emitters, emission localized to the nanometer scale is made possible. Experimental data, corroborated in independent experiments, has shown the effect is repeatable and reproducible.

The ability to create a nanometer/micron sized electron beam in the energy range of several keV up to 100 keV opens up the possibility of building a scanning probe microscope that operates both as an atomic force and a scanning elemental analysis microscope. Via micro-fabrication it is straightforward to increase the rate of thermal cycling and so upscale the high energy electron current by a factor of 10,000, so as to provide a new technology for flat panel display and make possible a handheld [nonradioactive] device capable of detecting e small quantities of elements from phosphorous to plutonium.

The point source of high-energy electrons produced by the crystal generators of the present invention provides the ideal realization of a transmission electron microscope. The resolution of this microscope will be determined by the size of the emitting region. Various means of capping the crystal, as described above, allow one to achieve the goal of nanometer resolution. When a metallic tip is further caped off with a carbon nano-tube containing metallic impurities the emitted electrons will generate x-rays by a Bremsstrahlung process.

Having thus described exemplary embodiments of the present invention, it should be noted by those skilled in the art that the within disclosures are exemplary only and that various other alternatives, adaptations and modifications may be made within the scope of the present invention.

BIBLIOGRAPHY

1—M. E. Lines, A. M. Glass; Principles and Applications of Ferroelectrics and Related Materials, Clarendon Press Oxford 1977. B. A. Strukov, A. P. Levanyuk; Ferroelectric Phenomena in Crystals, Springer, Berlin 1998. Y. Xu; Ferroelectric Materials and their Applications, North Holland Amsterdam 1991.

2—H. Riege, Electron Emission From Ferroelectrics, Nucl. Instr. Meth. Phys. Res. A 340, 80-89 (1994).

2a—Glass, A. M. Dielectric, thermal, and pyroelectric properties of Ferroelectric $LiTaO_3$. Phys. Rev. 172, 564-571 (1968).

2b—Rosenblum, B., Braunlich, P. & Carrico, J. P. Thermally stimulated field emission from pyroelectric $LiNbO_3$. Appl. Phys. Lett. 25, 17-19 (1974). Also—U.S. Pat. No. 3,840, 748.

2c—Reige, H. Electron emission from ferroelecrices—a review. Nucl. Instr. And Meth. A 340, 80-89 (1994).

2d—Brownridge, J. D., Shafroth, S. M., Trott, D. W., Stoner, B. R. & Hooke, W. M. Observation of multiple nearly monenergetic electron production by heated pyroelectric crystals in ambient gas. Appl. Phys. Lett. 78, 1158-1159 (2001).

2e—Naranjo, B. & Putterman, S. Search for fusion from energy focusing phenomena in ferroelectric crystals. (http://www.physics.ucla.edu/~naranjo/ucei/ucei.pdf) (February 2002).

2f—Danon, Y. A novel compact pyroelectric x-ray and neutron source (http://neer.inel.gov/abstgract.asp?ProjectID=126) (2003).

2g—Brownridge, J. D. & Shafroth, S. M. Electron and positive ion beams and x-rays produced by heated and cooled pyroelectric crystals such as $LiNbO_3$ and $LiTaO_3$ in dilute gases: phenomenology and applications. (http://www.binghamton.edu/physics/Brownridge %20Summary.pdf) (2004).

3—B. P. Barber, R. A. Hiller, R. Lofstedt, S. J. Putterman, K. R. Weninger, Defining the Unknowns of Sonoluminescence; Phys. Rep. 281, 65-144, (1997)

4—J. D. Brownridge, S. Raboy, Investigations of Pyroelectric Generation of X-Rays, J. Appl. Phys. 86, 640-647 (1999).

5—G. Rosenman, D. Shur, Ya. E. Krasik, A. Dunavsky, Electron Emission from Ferroelectrics; J. Appl. Phys. 88, 6109-6161 (2000).

6—T. A. Jung et al, Chemical Information from Scanning Probe Microscopy in R. Wiesendanger, Scanning probe Microscopy: Analytic Methods [Springer 1998].

7—D. Skoog, F. Holler, T. Nieman, Principles of Instrumental Analysis, [Harcourt 1998], ch. 12.

8—F. J. Giessibl, H. Franz, J. Appl. Phys. 76, 1470 (2001).

9—S. J. Pennycock, D. E. Jesson, Phys. Rev. Lett 64, 938 (1990); D. E. Jesson, S. J. Pennycock, L. Baribeau, Phys. Rev. Lett. 66, 750 (1991), 10—(EDX, Reimer, L. (1985): *Scanning Electron Microscopy. Physics of Image Formation and Micronanalysis,* 2nd edn. Springer Ser. Opt. Sci., 45 (springer, Berlin, Heidelberg). Reed, S. J. B. (1975): *Electron Microprobe Analysis* (Cambridge Univ. Press, London). Goldstein, J. I., Newbury, D. E., Echlin P., Joy, D. C., Fiori, C., Lifshin, E. (1981): *Scanning Electron Microscopy and X-Ray Microanalysis* (Plenum, New York).]

11—S. J. Pennycock, L. A. Boatner, Nature 336, 565 (1988).

12—[D. E. Newbury, Nanotechnology 1, 103, (1990).

13—N. D. Browning et al., Nature 366, 143, (1993); D. A. Muller et al., Nature 366, 725, (1993); P. E. Batson, Nature 366, 727 (1993); J. Electron Microsc. 45, 51 (1996).

14—S. R. Morrison, *The Chemical Physics of Surfaces,* 2nd edn. [Plenum, New York] (1990).

15—H. Rohrer Surf. Sci. 299/300, 980, (1994); C. F. Quate., Surf. Sci. 299/300, 980, (1994).

16—, G. Binning et al., Phys. Rev. Lett. 50, 120 (1983); R. J. Hamers et al. (1986): Phys. Rev. Lett. 60, 2527, (1986); T. A. Jung et al., Phys. Rev. Lett. 74, 1641, (1995); F. J. Himpsel, J. Gimzewski et al. Jpn. J. Appl. Phys. Pt. 1, 35, 3695, (1996):

17—D. W. Pohl, "Scanning Neaar-field Optical Micrsocopy (SNOM) in *Advances in Optical and Electron Microscopy,* 12, 243 (London 1991); "*Nano-Optics and Scanning Near-Field Optical Microscopy,*" in *Scanning Tunneling Microscopy II": Further Applications and Related Scanning Techniques,* ed. by R. Wiesendanger and H.-J. Guntherodt, 2nd edn, Springer Ser. Surf. Sci., Vol. 28 (Springer, Berlin, Heidelberg 1992) pp. 223-271; E. Betzig, J. K. Trautman, Science 257, 189, (1992); H. Heinzelmann, D. W. Pohl, Appl. Phys. A 59, 89, (1994)

18—E. Betzig, R. J. Chichester, Science 262, 1422 (1993).

19—J. K. Trautman et al., Nature 369, 40 (1994). M. A. Paesler, P. J. Moyer, *Near-Field Optics. Theory, Instrumentation and Applications* (Wiley, New York 1996)]

20—J. K. Gimzewski et al., Z. Phys. B 72, 497 (1988).

21—. P. Johansson et al. Phys. Rev. B 42, 9210 (1990); R. Berndt, J. K. Gimzewski, P. Johansson, Phys. Rev. Lett. 67, 3796 (1991), B. N. J. Persson, A. Baratoff, Phys. Rev. Lett. 68, 3224 (1992), Y Uehara, et al.: Jpn. J. Appl. Phys. 31, 2465 (1992); R. Berndt, J. K. Gimzewski, P. Johansson: Phys. Rev. Lett 71, 3493 (1993).

22—R. Berndt et al., Phys. Rev. Lett. 74, 102 (1995).

23—R. Berndt et al.: Science 262, 1425 (1993).

24—R. Berndt, J. K. Gimzewski, P. Johansson, P., Phys. Rev. Lett. 67, 3796 (1991); R. Berndt, J. K. Gimzewski, Phys. Rev. B 48, 4746 (1993).

25—R. Berndt, J. K. Gimzewski, Phys. Rev. B 45, 14095 (1992).

26—L. L. Kazmerski, J. Vac. Sci. Technol. B 9, 1549, (1991).

27—J. K. Gimzewski et al., Ultramicrosc. 42/44, 366 (1991).

28—B. Michel et al., Rev. Sci. Instrum. 63, 4080 (1992).

29—J. P. Bourgoin et al., Appl. Phys. Lett. 65, 2045 (1994).

30—D. Rugar et al., Nature 360, 563 (1992); D. Rugar et al. Science 264, 1560 (1994).

31—O. Züger, D. Rugar, D., Appl. Phys. Lett. 63, 2496 (1993); J. Appl. Phys. 75, 6211 (1994).

32—O. Züger et al., J. Appl. Phys. 79, 188 (1996).

33—H. J. Kreuzer et al., Lensless Low Energy Point Source Microscopy, in Nanoscience and Manipulation of Atoms under High Fields and Temperatures: Applications, Vu T Binh, N. Garcia, K. Dransfeld; [Kluwer Academic Dordrecht 1993].

34—N. de Jonge et al, High Brightness Electron Beam from a Multi-Walled Carbon Nanotube, Nature, 420, 393 (2002).

35—K. Hirahara et al. One Dimensional Metallofullerene Crystal Generated Inside Single Walled Carbon Nanotubes, Phys. rev. Lett. 85, 5384 (2000); D. J. Hornbaker et al, Mapping the One-Dimensional Electronic States of Nanotube Peapod Structures, Science 295, 828 (2002).

36—Nevins, W. M. Can inertial electrostatic confinement work beyond the ion-ion collisional time scale? *Physics of Plasmas* 2, 3804-3819 (1995).

37—Farnsworth, P. T. Electric discharge device for producing interactions between nuclei. U.S. Pat. No. 3,258,402 (1966).

38—Farnsworth, P. T. Method and apparatus for producing nuclear-fusion reactions. U.S. Pat. No. 3,386,883 (1968).

39—Hirsch, R. L. Inertial-electrostatic confinement of ionized fusion gases. *J. Appl. Phys.* 38, 4522-4534 (1967).

40—Mitterauer, J. Micropropulsion for small spacecraft: a new challenge for field effect electric propulsion and microstructure liquid metal ion sources. Surf Interface Anal. 36, 380-386 (2004).

41—Naranjo, B., J. Gimzewski, J., Putterman, S., Observation of nuclear fusion driven by pyroelectric crystal, Nature (Apr. 28, 2005).

What is claimed is:

1. A crystal generator for producing a beam of ions or electrons, said crystal generator comprising:
    A) a ferroelectric, pyroelectric or piezoelectric crystal having a beam generating surface;
    B) an electrode attached to said crystal at said beam generating surface, said electrode comprising a beam directing tip that extends away from said electrode and said beam generating surface; and
    C) a temperature control element, said temperature control element being capable of changing the temperature of said ferroelectric crystal whereby a beam of ions or electrons is emitted from said beam directing tip.

2. A crystal generator according to claim 1 wherein said crystal is selected from the group of crystals consisting of lithium niobate, lithium tantalate and tri-glycine sulfate.

3. A crystal generator according to claim 1 wherein said electrode is made from a metal selected from the group consisting of copper, gold, tungsten and titanium.

4. A crystal generator according to claim 1 wherein said beam directing tip comprises a solid portion having a first end adjacent to said electrode and a second end displaced away from said electrode, said beam directing tip further including a tubular portion attached to the second end of said solid portion.

5. A crystal generator according to claim 1 wherein said beam directing tip is made from a metal selected from the group consisting of platinum, and tungsten.

6. A crystal generator according to claim 4 wherein said tubular portion comprises a carbon nanotube.

7. A crystal generator according to claim 4 wherein said tubular portion comprises a tube having an interior wall defining a tubular chamber and a metallic filler material located within said tubular chamber wherein said metallic filler material converts the electron beam generated by said ferroelectric crystal generator into a beam of x-rays.

8. A system comprising:
    A) a crystal generator for producing a beam of ions or electrons, said crystal generator comprising:
        a) a ferroelectric, pyroelectric or piezoelectric crystal having a beam generating surface;
        b) an electrode attached to said crystal at said beam generating surface, said electrode comprising a beam directing tip that extends away from said electrode and said beam generating surface;

b) a temperature control element, said temperature control element being capable of changing the temperature of said crystal whereby a beam of ions or electrons is emitted from said beam directing tip; and B) a target at which said beam of ions or electrons is directed.

9. A system according to claim 8 wherein said crystal is selected from the group of crystal consisting of lithium niobate, lithium tantalate and tri-glycine sulfate.

10. A system according to claim 8 wherein said electrode is made from a metal selected from the group consisting of copper, gold, tungsten and titanium.

11. A system according to claim 8 wherein said beam directing tip comprises a solid portion having a first end adjacent to said electrode and a second end displaced away from said electrode, said beam directing tip further including a tubular portion attached to the second end of said solid portion.

12. A system according to claim 8 wherein said beam directing tip is made from a metal selected from the group consisting of platinum and tungsten.

13. A system according to claim 11 wherein said tubular portion comprises a carbon nanotube.

14. A system according to claim 11 wherein said tubular portion comprises a tube having an interior wall defining a tubular chamber and a metallic filler material located within said tubular chamber wherein said metallic filler material converts the electron beam generated by said crystal generator into a beam of x-rays.

15. A system according to claim 8 wherein said target is deuterium or tritium.

16. A system according to claim 8 which comprises a plurality of said crystal generators for producing a plurality of beam of ions or electrons.

17. A method for directing a beam of energy onto a target, said method comprising the steps of:
   A) providing a crystal generator for producing a beam of ions or electrons, said crystal generator comprising:
      a) a ferroelectric, pyroelectric or piezoelectric crystal having a beam generating surface;
      b) an electrode attached to said ferroelectric crystal at said beam generating surface, said electrode comprising a beam directing tip that extends away from said electrode and said beam generating surface;
      b) a temperature control element, said temperature control element being capable of changing the temperature of said crystal whereby a beam of ions or electrons is emitted from said beam directing tip;
   B) providing a target at which said beam of ions or electrons is directed;
   C) operating said temperature control element to change the temperature of said crystal to provide said beam of ions or electrons; and
   D) directing said beam of ions or electrons at said target.

18. A method according to claim 17 wherein said target is deuterium or tritium and said beam of ions is of sufficient energy to cause nuclear fusion of said deuterium or tritium.

19. A method according to claim 17 that includes the step of converting said beam of electrons to a beam of x-rays that is directed to said target.

20. A method according to claim 17 where said temperature control element is operated to provide cycling of the temperature of said crystal to produce pulses of said beams of ions or electrons.

21. A method according to claim 17 wherein a plurality of said crystal generators are provided and said temperature control element is operated to provide a plurality of said beams of ions or electrons.

22. A crystal generator according to claim 1 wherein said crystal is laminated.

23. A pulsed neutron generator comprising a crystal generator according to claim 1 and a pulsing source of external ions that is directed at said crystal.

* * * * *